United States Patent
Bragg

(10) Patent No.: US 6,865,611 B1
(45) Date of Patent: Mar. 8, 2005

(54) COMMUNICATIONS SYSTEM, APPARATUS AND METHOD THEREFOR

(75) Inventor: Nigel L Bragg, Weston Colville (GB)

(73) Assignee: Nortel Networks Limited, St. Laurent (CA)

( * ) Notice: Subject to any disclaimer, the term of this patent is extended or adjusted under 35 U.S.C. 154(b) by 794 days.

(21) Appl. No.: 09/723,017

(22) Filed: Nov. 27, 2000

(51) Int. Cl.$^7$ .............................................. G06F 15/173
(52) U.S. Cl. ........................ 709/238; 709/246; 709/249
(58) Field of Search ................................ 709/238, 246, 709/249; 370/351, 399, 401, 409

(56) References Cited

U.S. PATENT DOCUMENTS

| | | | | |
|---|---|---|---|---|
| 6,434,144 B1 | * | 8/2002 | Romanov | 370/392 |
| 6,473,421 B1 | * | 10/2002 | Tappan | 370/351 |
| 6,483,833 B1 | * | 11/2002 | Jagannath et al. | 370/392 |
| 6,611,872 B1 | * | 8/2003 | McCanne | 709/238 |

* cited by examiner

*Primary Examiner*—Mehmet B. Geckil
(74) *Attorney, Agent, or Firm*—Barnes & Thornburg LLP

(57) ABSTRACT

In IPv6, a multi-homed domain comprises more than one connection to domains disposed hierarchically above the multi-homed domain. Consequently, more than one set of IP addresses exists corresponding to the more than one connection between the multi-homed domain and the hierarchically higher domains, respectively. At present, a first host associated with the multi-homed domain must choose between one of the more than one set of IP addresses in ignorance of the existence of a fault condition arising in connection with one of the sets of IP addresses, resulting in the first host becoming unreachable by a second host located elsewhere in the Internet. The present invention therefore provides a system, method and apparatus whereby a given domain transmits an address prefix to domains disposed hierarchically below the given domain and forward address prefixes received from domains disposed hierarchically above the given domain to domains disposed hierarchically below the given domain.

26 Claims, 5 Drawing Sheets

COMMUNICATIONS SYSTEM, APPARATUS AND METHOD THEREFOR

BACKGROUND TO THE INVENTION

The present invention relates to a communications system and a host apparatus, for example, of the type used in an Internet Protocol (IP) network having a hierarchically arranged addressing scheme. The present invention also relates to a method of ascertaining an available return route.

SUMMARY OF THE PRIOR ART

The Internet is a network of computer networks capable of allowing a first node attached to the network of computer networks to communicate with a second node attached to the network of computer networks, nodes being defined herein as including hosts or routers. The Internet was conceived by the Advanced Projects Research Agency (APRA) of the US Government in 1969 as a network to allow users of a research computer at one university to be able to "talk to" research computers at other universities; the network was known as the Advanced Projects Research Agency Network. The APRA Network was capable of routing or re-routing messages in more than one direction and so was able to continue functioning even if parts of the APRA network were destroyed, for example, as a result of a military attack or other disaster.

Presently, the Internet is public and is used by a large number of users throughout the world, the interconnection of the computer networks forming the Internet being supported by resources of current public telecommunications systems worldwide.

As is known in the art, the Internet employs, inter alia, an IP Layer and a Transmission Control Protocol (TCP) Layer. The Internet comprises a plurality of domains, each domain having associated therewith a set of Internet Protocol (IP) addresses. The domains are hierarchically arranged into tiers including a first tier comprising a number of domains that, together, form a default-free zone. In the default-free zone, packets processed by the first tier domains must not be lost, i.e. packets entering the first tier must be routed with integrity within the first tier up to a point where the packets leave the default-free zone. In this respect, the domains forming the first tier are interconnected in such a way so as to ensure that failure of one, or more, connections between domains in the first tier will not result in packets not reaching their respective destinations within the first tier.

From an addressing perspective, a domain is identifiable by a domain name, for example, ServiceProvider.net, the domain name corresponding to a pool of IP addresses allocated to the domain. An administrator of the domain is responsible for allocation of the IP addresses to individual entities within the domain from the pool of IP addresses allocated to the domain.

In Version 4 of the IP (IPv4), allocation of IP addresses to domains is without regard to network topology and has resulted in a need for domains in the first tier to maintain large routing tables. In order to reduce the size of the routing tables, Version 6 of the IP (IPv6) employs a provider addressing scheme. An IPv6 address is a 128-bit address comprising eight 16-bit "pieces" commonly separated by colons (":"), i.e. x:x:x:x:x:x:x:x, where x is a 16-bit piece of the IPv6 IP address. As is disclosed in the Internet Engineering Task Force (IETF) document entitled "An IPv6 Aggregatable Global Unicast Format" (Request for Comments [RFC] 2374, July 1998), the provider addressing scheme constrains allocation of a number of the pieces of the IPv6 IP address to certain domains in the Internet in accordance with respective positions of the certain domains within the hierarchy of domains forming the Internet. Specifically, a first domain connected, at the IP layer, to a second domain hierarchically above the first domain is constrained to use a set of IP addreses which are a subset of IPv6 IP addresses allocated to the second domain. Consequently, for example, the first 16-bit piece of the IPv6 IP address (hereinafter referred to as the "IP address") is reserved for the number of domains forming the first tier of the Internet. A dependent domain connected, at the IP layer, hierarchically below a given domain of the number of domains forming the first tier must have an IP address comprising the first 16-bit piece of the one of the number of domains to which the given domain is connected; a second portion (not constrained to be 16 bits), i.e. a number of bits, are allocated by the one of the number of domains to the given domain to define a portion of address space delegated to the given domain. Subsequent bits, i.e. after the first and second pieces, are allocatable by the given domain. A benefit of the provider addressing scheme is that the size of the routing tables maintained by the number of domains forming the first tier, and other domains connected hierarchically below the first tier, is considerably reduced. The one or more pieces of the IP address inherited from the hierarchically higher domain by the given domain is known as a global prefix.

For a number of reasons, including expenditure control and integrity of routing, many domains are multi-homed. A multi-homed domain comprises more than one connection to domains disposed hierarchically above the multi-homed domain. For example, the first domain connected, at the IP layer, to the second domain can also be connected, at the IP layer, to a third domain also disposed hierarchically above the first domain. A consequence of multi-homing the first domain is that the first domain comprises two sets of IP addresses, a first set being inherited from the second domain and including a first prefix inherited from the second domain, and a second set being inherited from the third domain and including a second prefix inherited from the third domain.

At present, a first host associated with the multi-homed domain must select one of the two sets of IP addresses as a sender address for sending to a second host in ignorance of an actual state of the Internet; a fault condition arising in one of the connections associated with one of the two sets of IP addresses, can result in the first host becoming unreachable by the second host located elsewhere in the Internet. This inability to reach the hosts contradicts one of the major motivations for multi-homing.

As an example, the first host has a first IP address having a first global prefix inherited from the second domain, and a second IP address having a second global prefix inherited from the third domain. If the connection between the first domain and the second domain fails, the first IP address becomes unreachable. A subsequent communication initiated by the second host trying to communicate with the first host using the first address as a destination address will fail resulting in receipt of an Internet Control Message Protocol (ICMP) unreachable message. Upon receipt of the ICMP unreachable message, the second host can be expected to try to initiate the communication with the first host again using the second IP address corresponding to the connection between the first domain and the third domain. However, if the first host initiates the communication with the second host, local routing mechanisms within the first domain will deliver outbound packets to the second host via the connection between the first domain and the third domain. If the first host had selected the first IP address as a source address of the outbound packets as a result of the mechanism described in the IETF document entitled "Default Address Selection for IPv6" (draft-ietf-ipngwg-default-addr-select-01.txt, July 2000), the communication can not be established, because the second host will, in reply, use the first IP address to communicate with the first host. The reply will be routed via the second domain as a consequence of the prefix of the first IP address, but will be undeliverable to the first domain as a result of the above-mentioned fault condition. Additionally, the first host does not receive, an indication as to a cause of the failure to establish the communication, even though the choice of the first host to use the first IP address is a contributory factor.

If the communication is established successfully and the connection between the first domain and the second domain fails during the communication, the communication will also fail and the first host will not receive an indication as to the cause of the failure. Hence, a viable strategy to recover the communication can not be formulated.

In the above examples, the failure of the communication is caused by the first host unwittingly specifying a valid, but unreachable, return route in the form of an IP address as a source address.

The IETF document entitled "IPv6 Multihoming with Route Aggregation" (<draft-ietf-ipngwg-ipv6multihome-with-aggr-01.txt>, J. Yu, August 2000) discloses that a solution used in IPv4 networks is incompatible with IPv6 route aggregation objectives, because this solution requires explicit exposure of the global prefix of the first domain to domains in the default free zone. "IPv6 Multihoming with Route Aggregation" discloses a new solution involving constraining deployment topologies of domains in order to avoid loss of aggregation in the default-free zone. Although the new solution can replace the traditional solution, the new solution requires a bilateral agreement between the second and third domains servicing the first domain; the new solution also leaves the host critically dependent upon one of the second and third domains.

SUMMARY OF THE INVENTION

According to a first embodiment of a first aspect of the invention there is provided a communications system comprising a plurality of top-level domains each having a respective top-level address space; a next-level domain connected one of directly and indirectly to more than one of the plurality of top-level domains, the next-level domain having respective next-level address spaces which are subsets of the respective top-level address spaces of the more than one of the plurality of top-level domains; and a host connected to the next-level domain, the host having host addresses which are members of the respective next-level address spaces such that, when a route is available from any of the more than one of the plurality of top-level domains to which the next-level domain is connected, the next-level domain is arranged to receive information from the ton-level domains having an available route, and the host is arranged to use the information to select from the host addresses, for use as its source address on transmission, an address corresponding to a route which is available.

Preferably, the information is an address prefix of the host addresses.

Preferably, lifetimes are assigned to the information and the host selects an address corresponding to information having an unexpired lifetime.

Preferably, at least one intermediate domain is connected between the next-level domain and a top-level domain and the at least one intermediate domain forwards the information from the top-level domain to the next-level domain.

Preferably, the next-level domain is arranged to receive information from the at least one intermediate domain when a route is available from the at least one intermediate domain to the next-level domain.

Preferably, the information from the at least one intermediate domain includes an address prefix inherited from a top-level domain to which the intermediate domain is one of directly and indirectly connected.

According to a second embodiment of the first aspect of the invention there is provided a communications system comprising: a host operably connected to a first network entity having a plurality of address spaces associated therewith, each such address space corresponding to one of a plurality of second network entities to which the first network entity is connected, the first network entity being arranged to receive information from at least one of the plurality of second network entities from which a return route is available, wherein the host is arranged to process said information from at least one of the plurality of second network entities to select from the plurality of address spaces an address corresponding to such an available return route.

According to a second aspect of the invention there is provided a host apparatus having a processing unit, the host apparatus to connect to a next-level domain connected one of directly and indirectly to more than one of a plurality of top-level domains of a communications system, each top-level domain having a respective top-level address space, the next-level domain having respective next-level address spaces which are subsets of respective top-level address spaces of the more than one of the plurality of top-level domains: the host apparatus having host addresses which are members of the respective next-level address spaces, and the processing unit being arranged to use information received by the next-level domain from the top-level domains when a route is available from said top-level domains to which the next-level domain is connected, to select from the host addresses, for transmission from the host apparatus, an address corresponding to a route which is available.

Preferably, the processing unit is arranged to use information which is an address prefix of the host addresses.

Preferably, lifetimes are assigned to the information and the processing unit is arranged to select an address corresponding to information having an unexpired lifetime.

Preferably, the processing unit is arranged to use information from at least one domain intermediate between the next-level domain a nd a top-level domain when a route is available from the at least one intermediate domain to the next-level domain.

Preferably, the processing unit is arranged to use information including an address prefix inherited from a top-level domain to which the intermediate domain is connected one of directly and indirectly.

According to a third aspect of the invention, there is provided a method of selecting an address for transmission by a host apparatus having a plurality of host addresses which are members of a respective plurality of address spaces of a next-level do main to which the host apparatus is connected, the next-level domain being connected one of directly and indirectly to more than one of a plurality of top-level domains of a communications system, each top-level domain having a respective top-level address space, the next-level domain having next-level address spaces which are subsets of the respective top-level address spaces of the plurality of top-level domains: the method comprising the steps of: the host receiving information forwarded by the next-level domain from at least one of the top-level domains when a route is available from said top-level domains to which the next-level domain is connected; and using the information to select from the plurality of host addresses, for transmission by the host apparatus, an address corresponding to a route which is available.

Preferably, the information is an address prefix of the addresses and the step of using the information to select from the plurality of addresses comprises selecting an address having a prefix that is a best match to the received prefix.

Preferably, lifetimes are assigned to the information and the step of using the information to select an address comprises selecting an address corresponding to information having an unexpired lifetime.

Preferably, wherein at least one intermediate domain is connected between the next-level domain and a top-level domain, the step of receiving information from the next-level domain comprises receiving information forwarded by the at least one intermediate domain from the top-level domain to the next-level domain.

Preferably, wherein at least one intermediate domain is connected between the next-level domain and a top-level domain, the step of receiving information from the next-level domain further comprises receiving information from the at least one intermediate domain when a route is available from the at least one intermediate domain to the next-level domain.

Preferably, the information from the at least one intermediate domain includes an address prefix inherited from a top-level domain to which the intermediate domain is one of directly and indirectly connected.

According to a fourth aspect of the invention, there is provided computer executable software code stored on a computer-readable medium for carrying out all the steps of a method of selecting an address for transmission by a host apparatus having a plurality of host addresses which are members of a respective plurality of address spaces of a next-level domain to which the host apparatus is connected, the next-level domain being connected one of directly and indirectly to more than one of a plurality of top-level domains of a communications system, each top-level domain having a respective top-level address space, the next-level domain having next-level address spaces which are subsets of the respective top-level address spaces of the plurality of top-level domains; the method comprising the steps of: the host receiving information forwarded by the next-level domain from at least one of the top-level domains when a route is available from said top-level domains to which the next-level domain is connected; and using the information to select from the plurality of host addresses, for transmission by the host apparatus, an address corresponding to a route which is available.

Preferably, the information is an address prefix of the addresses and the step of using the information to select from the plurality of addresses comprises selecting an address having a prefix that is a best match to the received prefix.

Preferably, lifetimes are assigned to the information and the step of using the information to select an address comprises selecting an address corresponding to information having an unexpired lifetime.

Preferably, wherein at least one intermediate domain is connected between the next-level domain and a top-level domain, the step of receiving information from the next-level domain comprises receiving information forwarded by the at least one intermediate domain from the top-level domain to the next-level domain.

Preferably, wherein at least one intermediate domain is connected between the next-level domain and a top-level domain, the step of receiving information from the next-level domain further comprises receiving information from the at least one intermediate domain when a route is available from the at least one intermediate domain to the next-level domain.

Preferably, the information from the at least one intermediate domain includes an address prefix inherited from a top-level domain to which the intermediate domain is one of directly and indirectly connected.

According to a fifth aspect of the invention, there is provided a programmed computer for carrying out all the steps of a method of selecting an address for transmission by a host apparatus having a plurality of host addresses which are members of a respective plurality of address spaces of a next-level domain to which the host apparatus is connected, the next-level domain being connected one of directly and indirectly to more than one of a plurality of top-level domains of a communications system, each ton-level domain having a respective top-level address space, the next-level domain having next-level address spaces which are subsets of the respective top-level address spaces of the plurality of top-level domains; the method comprising the steps of: the host receiving information forwarded by the next-level domain from at least one of the top-level domains when a route is available from said top-level domains to which the next-level domain is connected; and using the information to select from the plurality of host addresses, for transmission by the host apparatus, an address corresponding to a route which is available.

According to a sixth aspect of the invention, there is provided a computer readable medium having computer executable software code stored thereon for carrying out all the steps of a method of selecting an address for transmission by a host apparatus having a plurality of host addresses which are members of a respective plurality of address spaces of a next-level domain to which the host apparatus is connected, the next-level domain being connected one of directly and indirectly to more than one of a plurality of ton-level domains of a communications system, each top-level domain having a respective top-level address space, the next-level domain having next-level address spaces which are subsets of the respective top-level address spaces of the plurality of top-level domains; the method comprising the steps of: the host receiving information forwarded by the next-level domain from at least one of the top-level domains when a route is available from said top-level domains to which the next-level domain is connected; and using the information to select from the plurality of host addresses, for transmission by the host apparatus, an address corresponding to a route which is available.

TABLE 1

| | |
|---|---|
| 2073:0:0:0:5:400:102C:312F | 2073::5:400:102C:312F |
| 2B23:0:0:0:0:0:0:321 | 2B23::321 |
| 0:0:0:0:0:0:0:F | ::F |
| 0:0:0:0:0:0:0:0 | :: |

It is thus possible to provide a communications system, apparatus and method therefor that is entirely consistent with the IPv6 provider addressing scheme. The invention further advantageously enables a domain to know when an address becomes unreachable, thereby allowing the domain to select an IP address corresponding to a valid return route for communications.

BRIEF DESCRIPTION OF THE DRAWINGS

At least one embodiment of the present invention will now be described, by way of example only, with reference to the accompanying drawings, in which.

DETAILED DESCRIPTION OF A PREFERRED EMBODIMENT

Figure 1:
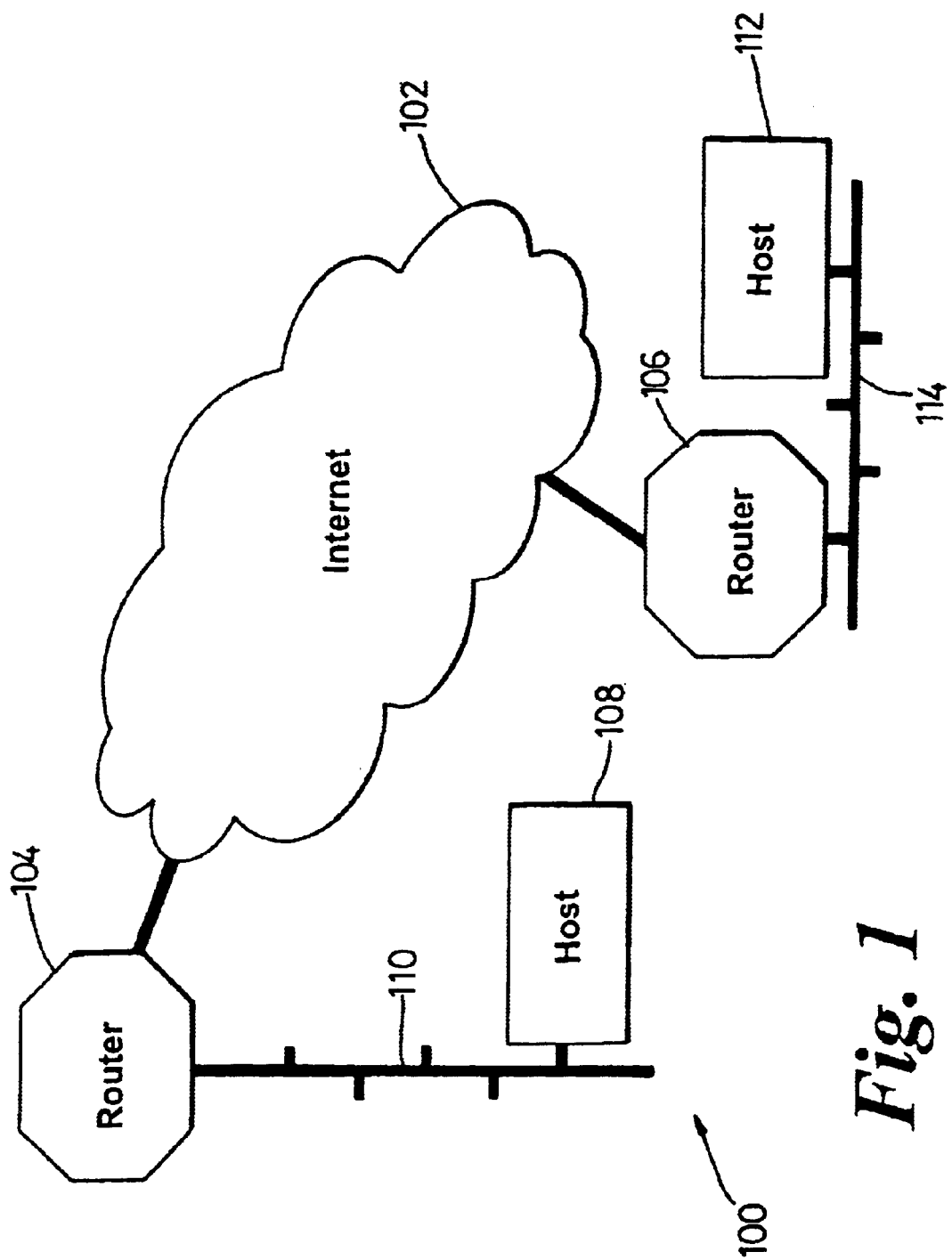
FIG. 1 is a schematic diagram of a communications system for use with a first and a second embodiment of the present invention.

Throughout the description, identical reference numerals are used to identify like parts.

A communications system 100 (FIG. 1) comprises a network of computer networks, for example, the Internet 102 arranged to operate in accordance with a communications protocol, such as the IPv6. The Internet 102 comprises a first router 104 at a first topological point of attachment to the Internet 102, and a second router 106 at a second topological point of attachment to the Internet 102. The first router 104 is connected, at an IP layer, to a first host 108 via a first link 110. The first host 108 has a candidate address list for storing source addresses, (global) source addresses having prefixes inherited from domains within a default-free zone to which the first host 108 is connected, and hence correspond to routes having available return communication routes. The second router 106 is connected, at the IP layer, to a second host 112 via a second link 114.

Since the Internet 102, the first and second host routers 104, 106, and the first and second hosts 108, 112 are arranged to operate in accordance with the IPv6, an IPv6 addressing scheme is employed in the communications system 100.

An IPv6 address is a 128-bit address comprising eight 16-bit "pieces" commonly represented by hexadecimal digits separated by colons (":"), i.e. x:x:x:x:x:x:x:x, where x is a 16-bit piece of the IPv6 IP address. Each 16-bit piece does not need to contain any leading zeros, but each 16-bit piece must contain at least one numeral, except where addresses contain zero-bits. When the address contains zero-bits, a special syntax is used to compress the zeros. A double colon ("::") is used to indicate the presence of multiple pieces of 16-bits of zeros and can be used to compress leading and/or trailing zeros in the IPv6 IP address. As an example, Table 1 below shows IPv6 IP addresses in both a long form and a shortened form, the shortened form employing the special syntax.

TABLE 1

| 2073:0:0:0:5:400:102C:312F | 2073::5:400:102C:312F |
| 2B23:0:0:0:0:0:0:321 | B23::321 |
| 0:0:0:0:0:0:0:F | ::F |
| 0:0:0:0:0:0:0:0 | :: |

Each IPv6 IP address space comprises a respective prefix specifying a contiguous set of addresses. The concept of the address prefix is core to routing technology and allows a single address prefix installed in a routing table to define an onward route for a set of addresses covered by the address prefix.

Text representation of the IPv6 IP address prefixes is in the form:

IPv6-address/prefix-length

The prefix-length is a decimal value specifying a number of left-most contiguous bits of the IPv6-address, the number of left-most contiguous bits being significant in defining the prefix. For example, in 23FF:0000:0000:EA21:0000:0000:0000:0000/16, only a first 16 bits are significant, and so can be written as 23FF::/16. Further details of the IPv6 IP addressing architecture is disclosed in "IP Version 6 Addressing Architecture", (IETF Network Working Group, RFC 2373).

Figure 2:
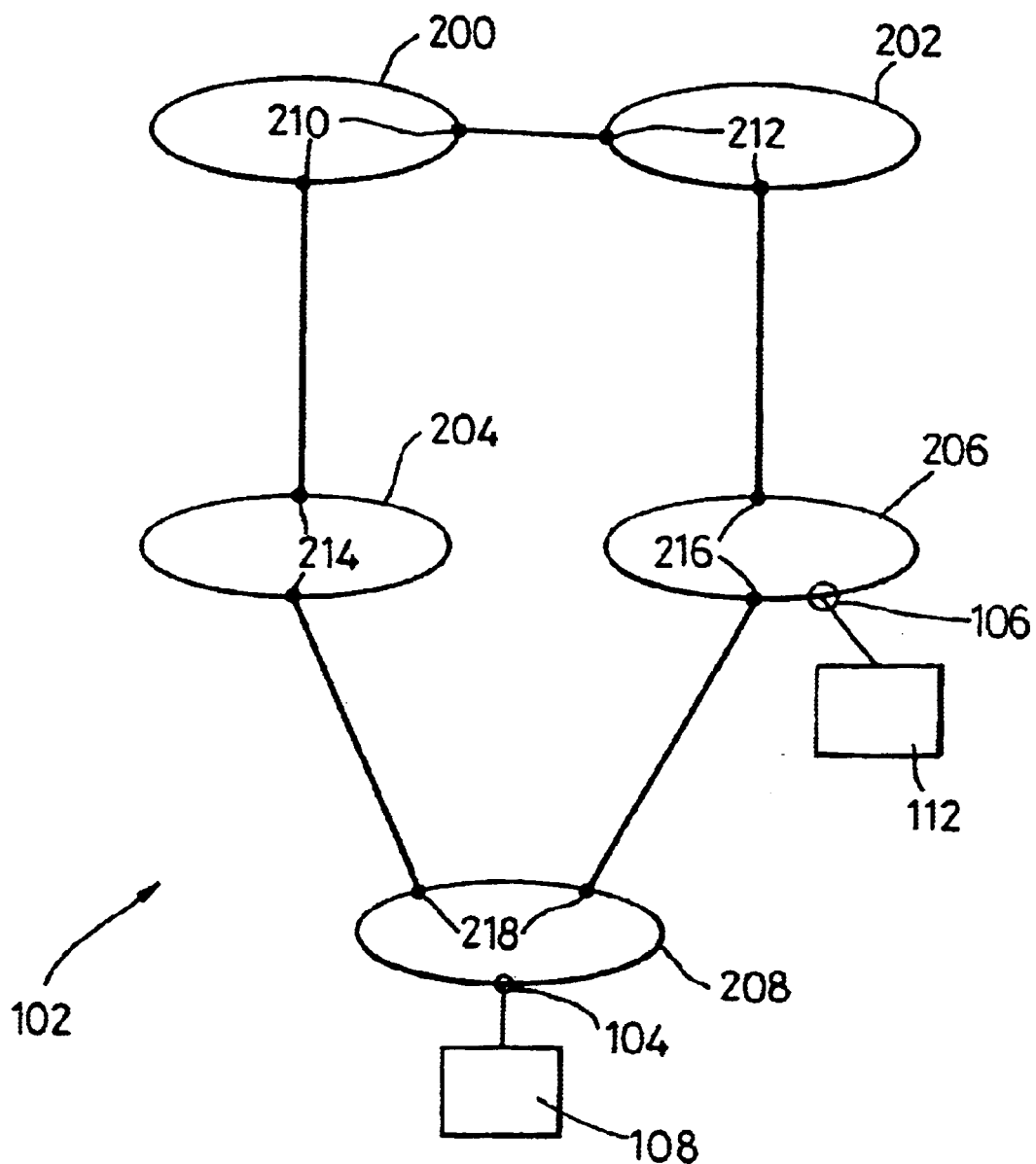
FIG. 2 is a schematic diagram of an Internet of FIG. 1 in more detail.

Referring to FIG. 2, the Internet 102 will now be described with reference to a simplified model of domains forming the Internet 102, for the purposes of clarity and ease of understanding. It should, of course, be appreciated that the Internet 102 can comprise a greater or fewer number of domains.

The Internet 102 comprises a first top level domain 200 connected, at the IP layer, to a second top level domain 202, the first and second top level domains constituting a default-free zone. The first top level domain 200 is connected, at the IP layer, to a first next level domain 204, and the second top level domain 202 is connected, at the IP layer, to a second next level domain 206. Both the first and second next level domains 204, 206 are respectively connected, at the IP layer, to a third next level domain 208, i.e. the third next level domain 208 is multi-homed. The first host 108 is, for example a Personal Computer (PC), and is connected, at the IP layer, to the third next level domain 208 via the first router 104. The first host 108 has a first IP address associated with a first route provided to the first top level domain 200, and a second IP address associated with a second route provided to the second top level domain 202. The first IP address is a member of a first address space of the third next level domain 208, the first address space of the third next level domain 208 being a subset of an address space of the first next level domain 204, and is inherited therefrom. The address space of the first next level domain 204 is a subset of an address space of the first top level domain 200 and is inherited therefrom. Similarly, the second IP address is a member of a second address space of the third next level domain 208, the second address space of the third next level domain 208 being a subset of an address space of the second next level domain 206 and is inherited therefrom. The address space of second next level domain 206 is a subset of an address space of the second top level domain 202 and is inherited therefrom.

The second host 112 is, for example a web content server, and is connected, at the IP layer, to the second next level domain 206 via the second router 106.

Each of the first and second top level domains 200, 202 respectively comprise a first and second set of border routers 210, 212 respectively interconnected by a first and second set of internal routers (not shown). The first and second set of border routers 210, 212 operate in accordance with a Border Gateway Protocol (BGP). The first and second set of internal routers operate in accordance with an Internal Gateway Protocol (IGP). Similarly, the first, second and third next level domains 204, 206, 208 respectively comprise a third, fourth and fifth set of border routers 214, 216, 218 respectively interconnected by a third, fourth and fifth set of internal routers (not shown). The third, fourth and fifth set of border routers 214, 216, 218 operate in accordance with the BGP, and the third, fourth and fifth set of internal routers operate in accordance with the IGP.

The first and second top level domains 200, 202 constitute respective first and second top level aggregators. Similarly, the first and second next level domains 204, 206 constitute respective first and second next level aggregators; the third next level domain 208 constitutes a third level aggregator. In this example, the above-mentioned domains are network entities, such as autonomous systems.

Each of the first and second top level domains 200, 202 and the first, second and third next level domains 204, 206, 208 are capable of supporting host auto-configuration mechanisms as described in "IPv6 Stateless Address Auto-configuration" by F. Thomson and T. Narten (IETF, RFC 2462, December 1998). Additionally, in order to identify a correct source address for communicating datagrams, such as IP packets, from the first host 108 to the second host 112, the first host 108 employs a modified address selection procedure, the modified address selection procedure being based upon the address selection procedure described in "Default Address Selection for IPv6" by R. Draves (<draft-ietf-ipngwg-default-addr-select-01.txt>, July 2000).

In a first embodiment of the invention, the communications system 100 operates as follows.

The first top level domain 200 and the second top level domain 202 each, respectively, injects a first top level aggregator prefix T1::/16 and a second top level aggregator prefix T2::/16 to the first next level domain 204 and the second next level domain 206. The injection of the first top level aggregator prefix T1::/16 and the second top level aggregator prefix T2::/16 is achieved using the BGP.

Figure 3:
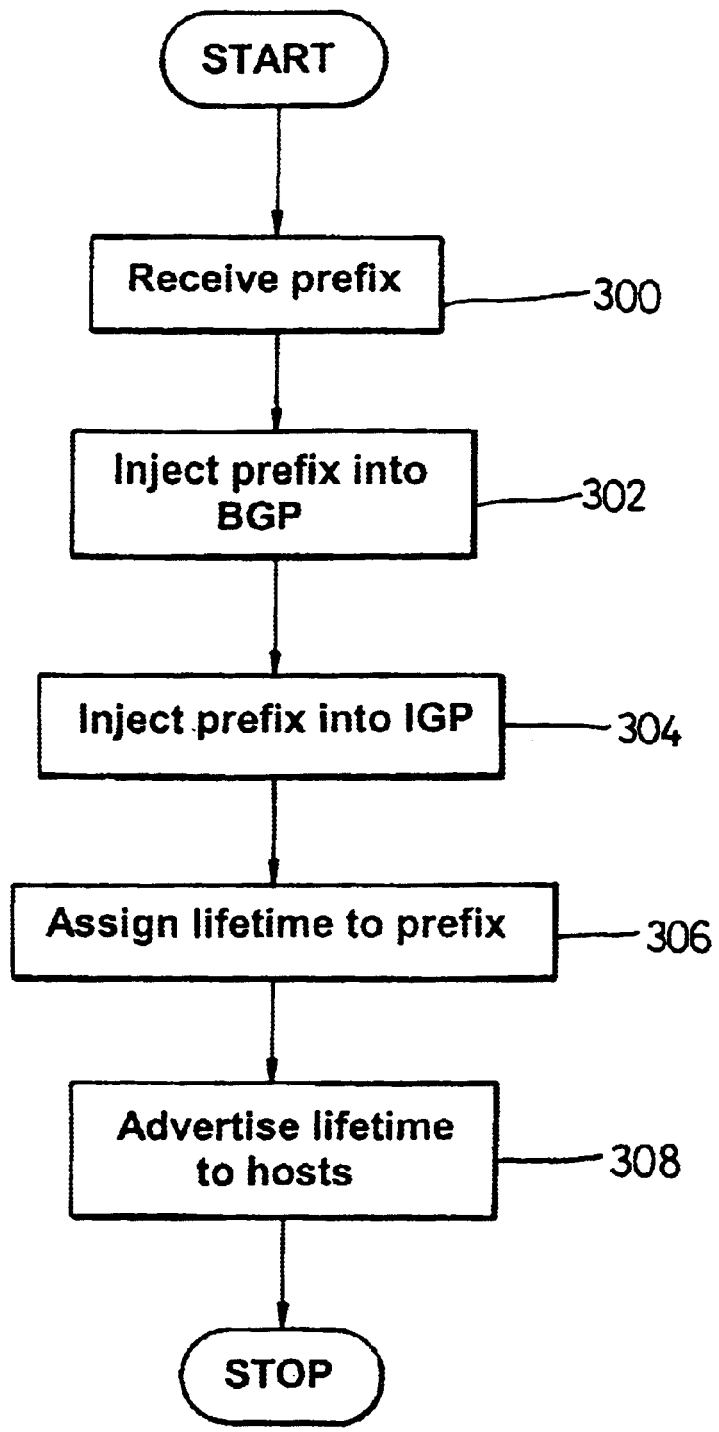
FIG. 3 is a flow diagram of a first method constituting the first embodiment of the present invention.

Referring to FIG. 3, a first border router of the third set of border routers 214 and a first border router of the fourth set of border routers 216 receive (step 300) the first top level aggregator prefix T1::/16 and the second top level aggregator prefix T2::/16, respectively. The first border router of the third set of border routers 214 then propagates (step 302) the first top level aggregator prefix T1::/16 to other border routers in the third set of border routers by injection of the first top level aggregator prefix T1::/16 into the BGP of the first next level domain 204. Similarly, the first border router of the fourth set of border routers 216 propagates (step 302) the second top level aggregator prefix T2::/16 to other border routers in the fourth set of border routers by injection of the second top level aggregated prefix T2::/16 into the BGP of the second next level domain 206.

The first border router of the third set of border routers also injects (step 304) the first top level aggregator prefix T1::/16 to the third set of internal routers. Similarly, the first border router of the fourth set of border routers injects (step 304) the second top level aggregator prefix T2::/16 into the IGP in order to disseminate the top level aggregator prefix T2::/16 to the fourth set of internal routers. A first lifetime and a second lifetime is then administratively determined, in accordance with any suitable technique known in the art, and assigned (step 306) to the first top level aggregator prefix T1::/16 and the second top level aggregator prefix T2::/16, respectively by all of the third and fourth set of internal routers 214, 216.

Using the host auto-configuration mechanism mentioned above, the second next level domain 206 communicates (step 308) the second top level aggregator prefix T2::/16 to the second host 112. The second top level aggregator prefix T2::/16 is also communicated to any other hosts connected to routers of the second next level domain 206. Similarly, the first next level domain 204 uses the host auto-configuration mechanism mentioned above to communicate (step 308) the first top level aggregator prefix T1::/16 to any hosts connected to routers of the first next level domain 204.

The injection of the first and second top level aggregator prefixes T1::/16, T2::/16 into the BGP also results in border routers in the third and fourth sets of border routers respectively forwarding (step 302) the first top level aggregator prefix T1::/16 and the second top level aggregator prefix T2::/16 to the third next level domain 208. In general, the dissemination of these prefixes by border routers is to border routers of other domains disposed hierarchically beneath a domain comprising the disseminating border routers.

A first border router and a second border router of the fifth set of border routers in the third next level domain 208 similarly receive (step 300) the first top level aggregator prefix T1::/16 and the second top level aggregator prefix T2::/16 from the first next level domain 204 and the second next level domain 206, respectively. If both the first top level aggregator prefix T1::/16 and the second top level aggregator prefix T2::/16 are received, the first border router and the second border router of the fifth set of border routers 218 respectively inject (step 302) the first and second top level aggregator prefixes T1::/16, T2::/16 into the BGP of the third next level domain 208 in order to communicate the first and second top level aggregator prefixes T1::/16, T2::/16 to other border routers in the fifth set of border routers 218. The first border router and the second border router of the fifth set of border routers 218 also respectively inject (step 304) the first and second top level aggregator prefixes T1::/16, T2::/16 into the IGP of the third next level domain 208, thereby communicating the first and second top level aggregator prefixes T1::/16, T2::/16 to the fifth set of internal routers. A first lifetime and a second lifetime are then administratively determined, in accordance with any suitable technique known in the art, and respectively assigned (step 306) to the first and second top level aggregator prefixes T1::/16, T2::/ 16. The router 104 then assigns (step 308) a first IP address corresponding to the first top level aggregator prefix T1::/16 and the associated first lifetime and a second IP address corresponding to the second top level aggregator prefix T2::/16 and the second associated lifetime to the first host 108 using the Host-Auto configuration Protocol. If at any time, one of the first or second top level aggregator prefixes T1::/16, T2::/16 are not received by the third next level domain 208, for example if the path between the second top level domain 202 and the second next level domain 206 becomes faulted and is communicated as withdrawn by an BGP Update message, the fifth set of internal routers set the second lifetime associated with the second top level domain prefix T2::/16 to zero, signifying that the second route associated with the second top level domain 202 has been withdrawn. Upon receipt of the BGP Update message, withdrawal of the second route is injected into the IGP for communication to the fifth set of internal routers. The path between the second top level domain 202 and the second next level domain 206 can become withdrawn for a number of reasons, for example, a hardware failure at either of the second top level domain 202 or the second next level domain 206, or a fibre break severing the link therebetween.

Since the third next level domain 208 is not connected to any other domains hierarchically beneath the third next level domain 208, the first and/or second top level aggregator prefixes T1::/16, T2::/16 are not forwarded by any of the fifth set of border routers.

Under fault-free circumstances, the first host 108 can use the second source address associated with the second top level domain 202 in order to communicate with the second host 112. However, if the path between the second next level domain 206 and the third next level domain 208 is withdrawn, the information provided by the third next level domain 208, enables the first host 108 to decide, if necessary, to use the first source address associated with the first top level domain 200 instead of the second source IP address associated with the second top level domain 202, thereby ensuring that an available return route exists for the second host 112 to use when sending datagrams to the first host 108.

In a second embodiment of the invention, any given domain is arranged to advertise a domain prefix associated with the any given domain downwards to domains disposed hierarchically below the any given domain. Additionally, the any given domain is arranged to receive, where appropriate, address prefixes from a domain disposed hierarchically above the any given domain, and forwards the address prefixes received to domains disposed hierarchically below the any given domain.

In a further embodiment of the invention, the any given domain, where applicable, forwards a hierarchically highest, i.e. shortest of the domain prefixes received downwards to the domains disposed hierarchically below the any given domain, instead of all prefixes received.

Figure 4:
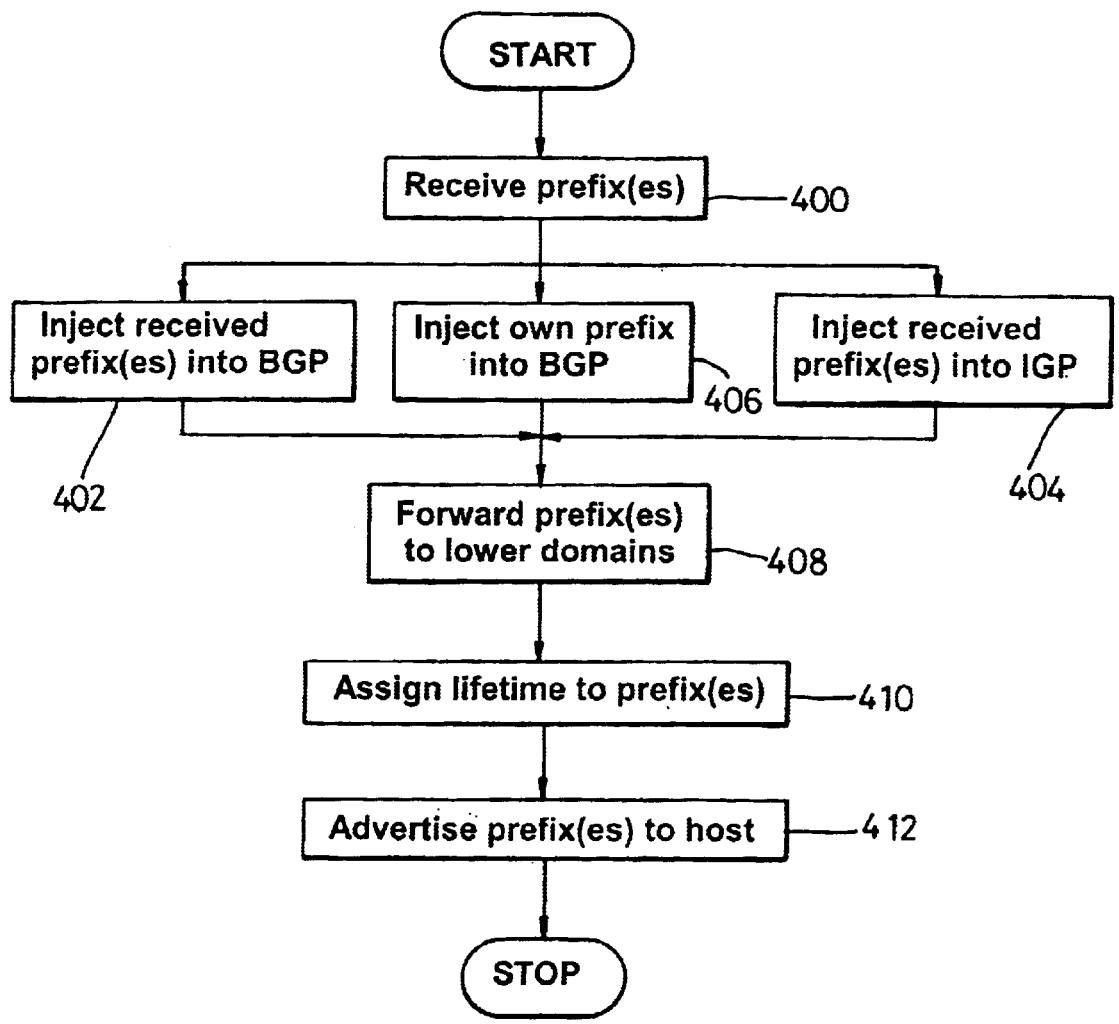
FIG. 4 is a flow diagram of a second method constituting the second embodiment of the present invention.

Referring to FIG. 4, in the second embodiment, the first and second top level domains 200, 202 are arranged to inject, i.e. communicate (step 406 and 408), downwards to the first next level domain 204 and the second next level domain 206, the first top level aggregator prefix T1::/16 and the second top level aggregator prefix T2::/16, respectively. Since the first and second top level domains 200, 202 do not have domains disposed hierarchically thereabove, the first and second top level domains 200, 202 only advertise the first and second top level aggregator prefixes T1::/16, T2::/16 downwards, respectively.

The first border router of the third set of border routers 214 of the first next level domain 204 receives (step 400) the first top level aggregator prefix T1::/16 from the first top level domain 200.

The first border router of the third set of border routers 214 then injects (step 402) the first top level aggregator prefix T1::/16 received into the BGP of the first next level domain 204 in order to disseminate the first top level aggregator prefix T1::/16 to the other border routers of the third set of border routers. The first border router of the third set of border routers also injects (step 404) the first top level aggregator prefix T1::/16 into the IGP of the first next level domain 204 in order to disseminate the first top level aggregator prefix T1::/16 to the third set of internal routers.

The third set of border routers of the first next level domain 204, which provide connectivity to domains disposed hierarchically below the first next level domain 204 also inject (step 406) a first next level prefix T1:N1::/16+n1 to the third next level domain 208, where n1 is the length of the piece of the first next level aggregator prefix corresponding to the identity of the first next level domain 204.

The first top level aggregator prefix T1::/16 and the first next level aggregator prefix T1:N1::/16+n1 injected into the BGP of the first next level domain 204 are forwarded (step 408) by the other border routers of the third set of border routers 214 to border routers of any domains disposed hierarchically below the first next level domain 204, in this example, the third next level domain 208.

A first lifetime is administratively determined, in accordance with any suitable technique known in the art, and assigned (step 410) to the first top level aggregator prefix T1::/16. Any internal routers of the first next level domain 204 connected to hosts advertises (step 412) IP addresses to the hosts using the host autoconfiguration protocol.

The second next level domain 206 operates in an analogous manner to the first next level domain 204. However, instead of operating with the first top level aggregator prefix T1::/16 and the first next level aggregator prefix T1:N1::/16+n1, the second next level domain 206 operates with the second top level aggregator prefix T2::/16, and a second next level aggregator prefix T2:N2::/16+n2 associated with the second next level domain 206, where n2 is the length of the piece of the second next level aggregator prefix corresponding to the identity of the second next level domain 206. If, as is the case with the second next level domain 206, a host, for example the second host 112, is connected to the second next level domain 206, the second router 106 assigns (step 410) a lifetime, previously determined in accordance with any known administrative technique, to a prefix used to form an IP address (hereinafter referred to as a "host address") inherited from the second top level domain 202 and assigns (step 412) the host address and the lifetime associated therewith to the second host 112 using the host autoconfiguration protocol. The second next level domain 206 (and the first next level domain 204) each then recommence the process of advertising and forwarding prefixes (steps 400 to 412).

The first border router of the fifth set of border routers 218 receives (step 400) the first top level aggregator prefix T1::/16 forwarded by the first next level domain 204, and the first next level aggregator prefix T1:N1::/16+n1 advertised by the first next level domain 204. Similarly, the second border router of the fifth set of border routers 218 receives (step 400) the second top level aggregator prefix T2::/16 forwarded by the second next level domain 206, and the second next level aggregator prefix T2:N2::/16+n2 advertised by the second next level domain 206. The first and second border routers of the fifth set of border routers 218 then inject (step 402) the first and second top level aggregator prefixes T1::/16, T2::/16 and the first and second next level aggregator prefixes T1:N1::/16+n1, T2:N2::/16+n2 into the BGP in order to disseminate the prefixes to the other border routers of the fifth set of border routers 218. Additionally, the first and second border routers of the fifth set of border routers 218 inject (step 404) the prefixes into the IGP of the third domain 208 in order to disseminate the prefixes to the fifth set of internal routers.

In relation to third next level aggregator prefixes (T1:N1:N3::/16+n1+n3, or T2:N2:N3::/16+n2+n3), the first and second top level aggregator prefixes T1::/16, T2::/16 and the first and second next level aggregator prefixes T1:N1::/16+n1, T2:N2::/16+n2, these prefixes are not advertised/forwarded (step 408) by the third next level domain 208, because there are no domains connected hierarchically below the third next level domain 208. Consequently, the third next level domain 208 simply needs to process the prefixes received.

At the third next level domain 208, if both the first top level aggregator prefix T1::/16 and the first next level aggregator prefix T1:N1::/16+n1 are both received (step 402), the third next level domain 208 identifies the highest, hierarchically, of the first top level aggregator prefix T1::/16 and the first next level aggregator prefix T1:N1::/16+n1. Clearly, the first top level aggregator prefix T1::/16 is hierarchically the highest and so a first return communications route exists from the third next level domain 208 up to the first top level domain 200.

Additionally, if the third next level domain 208 receives (step 400) the second top level aggregator prefix T2::/16 and the second next level aggregator prefix T2:N2::/16+n2, the third next level domain 208 identifies the highest, hierarchically, of the second top level aggregator prefix T2::/16 and the second next level aggregator prefix T2:N2::/16+N2. Clearly, the second top level aggregator prefix T2::/16 is hierarchically the highest and so a second return communications route exists from the third next level domain 208 up to the second top level domain 202.

The provision of address prefixes with associated lifetimes enables the first host 108 to identify whether a given route associated with a given top level domain has become unavailable.

If the path between the second top level domain 202 and the second next level domain 206 becomes withdrawn, the second next level domain 206 will not receive the second top level aggregator prefix T2::/16 from the second top level domain 202. Consequently, if the third next level domain 208 were connected to a fourth next level domain (not shown) hierarchically below the third next level domain 208, the third next level domain 208 would only be in possession of the first top level aggregator prefix T1::/16, the first next level aggregator prefix T1:N1::/16+n1 and the second next level aggregator prefix T2:N2::/16+n2 and so only these prefixes and T1:N1:N3::/16+n1+n3 (corresponding to the third next level domain via the first route), and T2:N2:N3::/16+n2+n3 (corresponding to the third next level domain via the second route) would be transmitted (steps 402, 406 and 408) to the fourth next level domain. Upon receipt of the prefixes, the fourth next level domain would be able to ascertain that the first route exists all the way up to the first top level domain 200, but the second route all the way up to the second top level domain 202 is not possible, the second route up to the second top level domain 202 being possible only as far as the second next level domain 206.

Once route availability has been established, for example, by the third next level domain 208, the host autoconfiguration protocol is used by routers connected to hosts, for example the first router 104, to assign (step 410) a first lifetime to the first route and a second lifetime to the second route, the shortest prefixes known to the first router 104 being communicated to the first host 108.

The first router 104 possesses the following prefixes:
T1::/16,
T1:N1::/16+n1, and
T2:N2::/16+n2.

Figure 5:
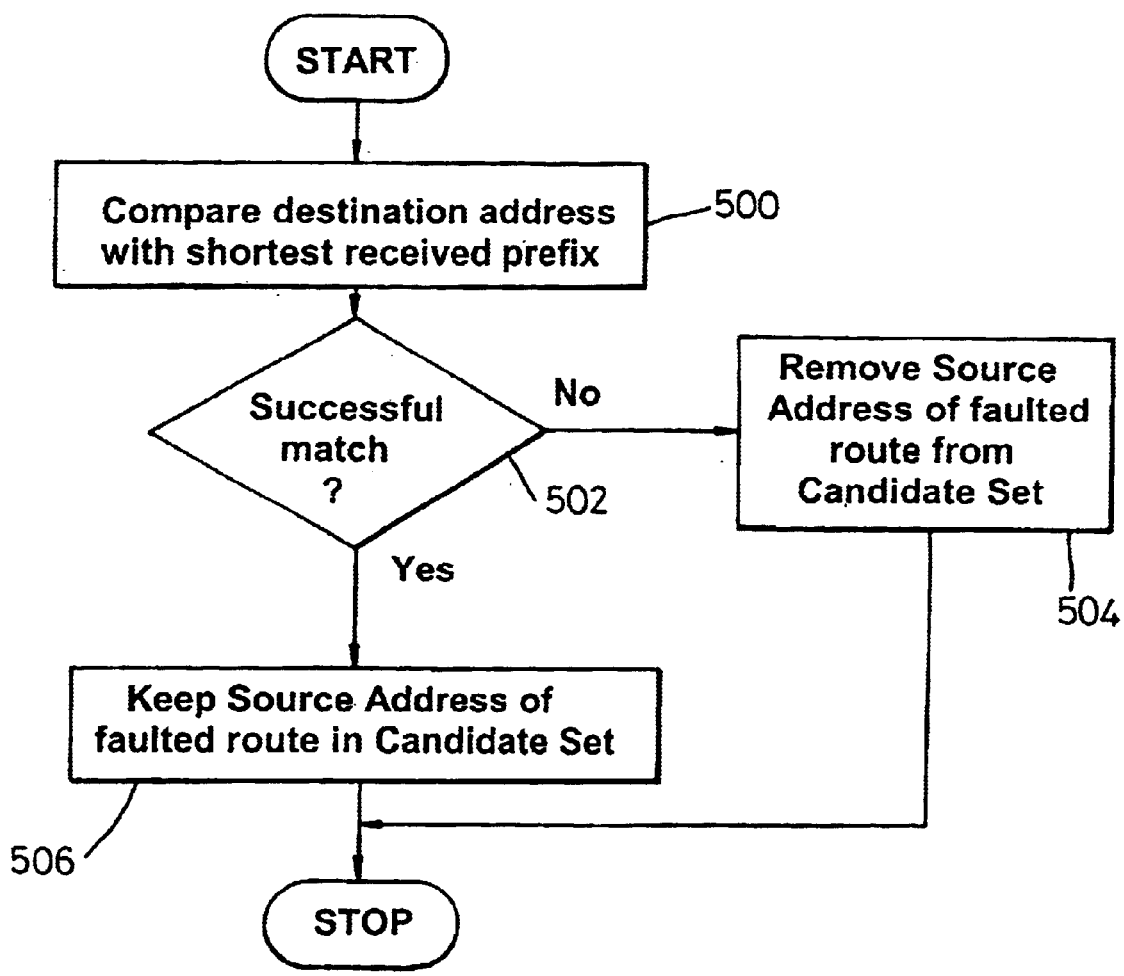
FIG. 5 is a flow diagram of an address selection procedure for use with the embodiment of FIG. 5.

Therefore, the first router 104 communicates the first top level aggregator prefix T1::/16 and the second next level aggregator prefix T2:N2::/16+n2 to the first host 108. Hence, the first host 108 can execute an address selection procedure (FIG. 5) in order to ensure that an unreachable host address associated with the first host 108, for example an IP address requiring the second route beyond the second next level domain 206, is not selected by the first host 108.

In order to better understand the route selection procedure, the procedure will now be described in relation to the first host 108 preparing to send a packet to the second host 112 having a host address that is used as a destination address for the packet, the host address of the second host being derived from the second top level domain 202 and the second next level domain 206, i.e. the first 16+n2 bits of the host address is T2:N2.

The first host 108 executes a loop for each faulted route implied by the set of addresses with which the first host 108 is configured. A candidate destination address of the packet is compared (step 500) with a shortest aggregator prefix received on the each faulted route in order to identify (step 502) a match between the shortest aggregator prefix received and an equivalent portion of the candidate destination address. If no match between the shortest aggregator prefix received and the candidate destination address is found, the source address corresponding to the each faulted route is removed (step 504) from the candidate address list. If, however, the match between the shortest aggregator prefix received and the candidate destination address is found, the existence of the match is indicative of the destination address being located below the fault and the source address corresponds to this route is maintained (step 506) in the candidate address list. Hence, in this example, the first and second source addresses are maintained in the candidate address list. If, however, the second host 112 is connected, at the IP layer, to the second top level domain 202 instead of the second next level domain 206 and the path between the second top level domain 202 and the second next level domain 206 is withdrawn, the prefix of the destination address would not match the shortest aggregator prefix of the faulted route received and so the second source address would be removed from the candidate address list as no return path exists between the first and second hosts 108, 112 via the second route.

The source addresses remaining in the candidate address list correspond to source addresses that can be used by the second host 112 to communicate with the first host 108. The first host 108 then selects one of, if any, source addresses from the candidate address list in accordance with any predetermined selection criteria, for example, policy. Upon receipt of the datagram containing the source address, the second host 112 can use the source address received as a destination address for a datagram in reply to the datagram received with confidence that the return route for the first host 108 is available.

Although the above examples have been described in the context of the third next level domain 208 being dual-homed, it should be appreciated that the above described system, apparatus and method is equally applicable to multi-homed domains. Additionally, although three tiers of domains have been described above, it should be understood that greater or fewer levels of domains can be provided.

Alternative embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example microwave or infrared. The series of computer instructions can constitute all or part of the functionality described above, and can also be stored in any memory device, volatile or non-volatile, such as semiconductor, magnetic, optical or other memory device.

What is claimed:

1. A communications system comprising a plurality of top-level domains each having a respective top-level address space; a next-level domain connected one of directly and indirectly to more than one of the plurality of top-level domains, the next-level domain having respective next-level address spaces which are subsets of the respective top-level address spaces of the more than one of the plurality of top-level domains; and a host connected to the next-level domain, the host having host addresses which are members of the respective next-level address spaces such that, when a route is available from any of the more than one of the plurality of top-level domains to which the next-level domain is connected, the next-level domain is arranged to receive information from the top-level domains having an available route, and the host is arranged to use the information to select, from the host addresses, for use as its source address on transmission, an address corresponding to a route which is available.

2. A communications system as claimed in claim 1, wherein the information is an address prefix of the host addresses.

3. A communications system as claimed in claim 1, wherein lifetimes are assigned to the information and the host selects an address corresponding to information having an unexpired lifetime.

4. A communications system as claimed in claim 1, wherein at least one intermediate domain is connected between the next-level domain and a top-level domain and the at least one intermediate domain forwards the information from the top-level domain to the next-level domain.

5. A communications system as claimed in claim 4, wherein the next-level domain is arranged to receive information from the at least one intermediate domain when a route is available from the at least one intermediate domain to the next-level domain.

6. A communications system as claimed in claim 5, wherein the information from the at least one intermediate domain includes an address prefix inherited from a top-level domain to which the intermediate domain is connected one of directly and indirectly.

7. A communications system comprising: a host operably connected to a first network entity having a plurality of address spaces associated therewith, each such address space corresponding to one of a plurality of second network entities to which the first network entity is connected, the first network entity being arranged to receive information from at least one of the plurality of second network entities from which a return route is available, wherein the host is arranged to process said information from at least one of the plurality of second network entities to select from the plurality of address spaces an address corresponding to such an available return route.

8. A host apparatus having a processing unit, the host apparatus to connect to a next-level domain connected one of directly and indirectly to more than one of a plurality of top-level domains of a communications system, each top-level domain having a respective top-level address space, the next-level domain having respective next-level address spaces which are subsets of respective top-level address spaces of the more than one of the plurality of top-level domains; the host apparatus having host addresses which are members of the respective next-level address spaces, and the processing unit being arranged to use information received by the next-level domain from the top-level domains when a route is available from said top-level domains to which the next-level domain is connected, to select from the host addresses, for transmission from the host apparatus, an address corresponding to a route which is available.

9. A host apparatus as claimed in claim 8, wherein the processing unit is arranged to use information which is an address prefix of the host addresses.

10. A host apparatus as claimed in claim 8, wherein lifetimes are assigned to the information and the processing unit is arranged to select an address corresponding to information having an unexpired lifetime.

11. A host apparatus as claimed in claim 8, wherein the processing unit is arranged to use information from at least one domain intermediate between the next-level domain and a top-level domain when a route is available from the at least one intermediate domain to the next-level domain.

12. A host apparatus as claimed in claim 11, wherein the processing unit is arranged to use information including an address prefix inherited from a top-level domain to which the intermediate domain is connected one of directly and indirectly.

13. A method of selecting an address for transmission by a host apparatus having a plurality of host addresses which are members of a respective plurality of address spaces of a next-level domain to which the host apparatus is connected, the next-level domain being connected one of directly and indirectly to more than one of a plurality of top-level domains of a communications system, each top-level domain having a respective top-level address space, the next-level domain having next-level address spaces which are subsets of the respective top-level address spaces of the plurality of top-level domains; the method comprising the steps of:

the host receiving information forwarded by the next-level domain from at least one of the top-level domains when a route is available from said top-level domains to which the next-level domain is connected; and using the information to select from the plurality of host addresses, for transmission by the host apparatus, an address corresponding to a route which is available.

14. A method as claimed in claim 13, wherein the information is an address prefix of the addresses and the step of using the information to select from the plurality of addresses comprises selecting an address having a prefix that is a best match to the received prefix.

15. A method as claimed in claim 13, wherein lifetimes are assigned to the information and the step of using the information to select an address comprises selecting an address corresponding to information having an unexpired lifetime.

16. A method as claimed in claim 13, wherein at least one intermediate domain is connected between the next-level domain and a top-level domain, further wherein the step of receiving information from the next-level domain comprises receiving information forwarded by the at least one intermediate domain from the top-level domain to the next-level domain.

17. A method as claimed in claim 13, wherein at least one intermediate domain is connected between the next-level domain and a top-level domain, further wherein the step of receiving information from the next-level domain further comprises receiving information from the at least one intermediate domain when a route is available from the at least one intermediate domain to the next-level domain.

18. A method as claimed in claim 17, wherein the information from the at least one intermediate domain includes an address prefix inherited from a top-level domain to which the intermediate domain is one of directly and indirectly connected.

19. Computer executable software code stored on a computer-readable medium for carrying out all the steps of a method of selecting an address for transmission by a host apparatus having a plurality of host addresses which are members of a respective plurality of address spaces of a next-level domain to which the host apparatus is connected, the next-level domain being connected one of directly and indirectly to more than one of a plurality of top-level domains of a communications system, each top-level domain having a respective top-level address space, the next-level domain having next-level address spaces which are subsets of the respective top-level address spaces of the plurality of top-level domains; the method comprising the steps of:

the host receiving information forwarded by the next-level domain from at least one of the top-level domains when a route is available from said top-level domains to which the next-level domain is connected; and using the information to select from the plurality of host addresses, for transmission by the host apparatus, an address corresponding to a route which is available.

20. Computer executable software code as claimed in claim 19, wherein the information is an address prefix of the addresses and the step of using the information to select from the plurality of addresses comprises selecting an address having a prefix that is a best match to the received prefix.

21. Computer executable software code as claimed in claim 19, wherein lifetimes are assigned to the information and the step of using the information to select an address comprises selecting an address corresponding to information having an unexpired lifetime.

22. Computer executable software code as claimed in claim 19, wherein at least one intermediate domain is connected between the next-level domain and a top-level domain, further wherein the step of receiving information from the next-level domain comprises receiving information forwarded by the at least one intermediate domain from the top-level domain to the next-level domain.

23. Computer executable software code as claimed in claim 19, wherein at least one intermediate domain is connected between the next-level domain and a top-level domain, further wherein the step of receiving information from the next-level domain further comprises receiving information from the at least one intermediate domain when a route is available from the at least one intermediate domain to the next-level domain.

24. Computer executable software code as claimed in claim 23, wherein the information from the at least one intermediate domain includes an address prefix inherited from a top-level domain to which the intermediate domain is one of directly and indirectly connected.

25. A programmed computer for carrying out all the steps of a method of selecting an address for transmission by a host apparatus having a plurality of host addresses which are members of a respective plurality of address spaces of a next-level domain to which the host apparatus is connected, the next-level domain being connected one of directly and indirectly to more than one of a plurality of top-level domains of a communications system, each top-level domain having a respective top-level address space, the next-level domain having next-level address spaces which are subsets of the respective top-level address spaces of the plurality of top-level domains; the method comprising the steps of:

the host receiving information forwarded by the next-level domain from at least one of the top-level domains when a route is available from said top-level domains to which the next-level domain is connected; and using the information to select from the plurality of host addresses, for transmission by the host apparatus, an address corresponding to a route which is available.

26. A computer readable medium having computer executable software code stored thereon for carrying out all the steps of a method of selecting an address for transmission by a host apparatus having a plurality of host addresses which are members of a respective plurality of address spaces of a next-level domain to which the host apparatus is connected, the next-level domain being connected one of directly and indirectly to more than one of a plurality of top-level domains of a communications system, each top-level domain having a respective top-level address space, the next-level domain having next-level address spaces which are subsets of the respective top-level address spaces of the plurality of top-level domains; the method comprising the steps of:

the host receiving information forwarded by the next-level domain from at least one of the top-level domains when a route is available from said top-level domains to which the next-level domain is connected; and using the information to select from the plurality of host addresses, for transmission by the host apparatus, an address corresponding to a route which is available.

* * * * *